US010200800B2

(12) United States Patent
Thomson

(10) Patent No.: US 10,200,800 B2
(45) Date of Patent: Feb. 5, 2019

(54) ACOUSTIC CHARACTERIZATION OF AN UNKNOWN MICROPHONE

(71) Applicant: EVA Automation, Inc., Redwood City, CA (US)

(72) Inventor: Sean Thomson, Worthing (GB)

(73) Assignee: EVA Automation, Inc., Menlo Park, CA (US)

(*) Notice: Subject to any disclaimer, the term of this patent is extended or adjusted under 35 U.S.C. 154(b) by 19 days.

(21) Appl. No.: 15/425,088

(22) Filed: Feb. 6, 2017

(65) Prior Publication Data

US 2018/0227687 A1 Aug. 9, 2018

(51) Int. Cl.

| | |
|---|---|
| ***G06F 3/16*** | (2006.01) |
| ***H04R 3/04*** | (2006.01) |
| ***H04R 29/00*** | (2006.01) |

(52) U.S. Cl.

CPC ........... *H04R 29/004* (2013.01); *G06F 3/162* (2013.01); *H04R 3/04* (2013.01); *H04R 2420/07* (2013.01); *H04R 2499/11* (2013.01); *H04R 2499/15* (2013.01)

(58) Field of Classification Search

CPC .... H04R 29/004; H04R 29/00; H04R 29/008; G06F 3/162; G06F 3/165; G10K 15/12

USPC ............................................ 381/161, 58, 98

See application file for complete search history.

(56) References Cited

U.S. PATENT DOCUMENTS

| | | | | |
|---|---|---|---|---|
| 4,773,094 A | 9/1988 | Dolby | ............................ | 381/58 |
| 9,138,178 B2 | 2/2015 | Lee et al. | ............... | A61B 5/128 |
| 9,468,401 B2 | 10/2016 | Van Hasselt et al. | ....................... | A61B 5/123 |
| 2007/0025560 A1* | 2/2007 | Asada | .................... | G10K 15/12 381/61 |
| 2012/0140936 A1 | 6/2012 | Bonnick et al. | ................ | 381/59 |
| 2016/0014534 A1* | 1/2016 | Sheen | .................. | H04R 29/007 381/59 |
| 2016/0029142 A1 | 1/2016 | Isaac | ....................... | H04S 7/301 |

(Continued)

FOREIGN PATENT DOCUMENTS

| | | | | |
|---|---|---|---|---|
| WO | WO 2014/032709 | 3/2014 | ............... | H04S 7/00 |
| WO | WO 2017/049169 | 3/2017 | ............... | H04R 3/04 |

OTHER PUBLICATIONS

Alberto Gonzales, et al., "Simultaneous Measurement of Multichannel Acoustic Systems," J. Aud. Eng. Soc., vol. 52, No. 1/2, Jan. 1, 2004, pp. 26-42.

*Primary Examiner* — Yogeshkumar Patel
(74) *Attorney, Agent, or Firm* — Steven Stupp

(57) ABSTRACT

An electronic device with a microphone is used to determine a transfer function of an environment (and, more generally, an acoustic characteristic). In particular, the electronic device may use the microphone to perform acoustic measurements when the electronic device is proximate to a speaker in the environment. Then, based on the acoustic measurements and a first predetermined transfer function of the speaker, the electronic device may calculate a transfer function of the microphone in a band of frequencies. Moreover, the electronic device may use the microphone to perform additional acoustic measurements in the environment that includes the speaker. Next, based on the additional acoustic measurements, the transfer function of the microphone and a second predetermined transfer function of the speaker, the electronic device may determine the transfer function of the environment in the same or a different band of frequencies.

23 Claims, 4 Drawing Sheets

(56) References Cited

U.S. PATENT DOCUMENTS

| | | | | |
|---|---|---|---|---|
| 2017/0083279 | A1* | 3/2017 | Sheen .................. | H04R 29/007 |
| 2017/0200442 | A1* | 7/2017 | Yamabe ............... | G10K 11/178 |

* cited by examiner

ACOUSTIC CHARACTERIZATION OF AN UNKNOWN MICROPHONE

BACKGROUND

Field

The described embodiments relate to a technique for characterizing a microphone and, in particular, for determining a transfer function of a microphone.

Related Art

Loudspeakers (which are sometimes referred to as 'speakers') are electroacoustic transducers that convert electrical signals into sound. Typically, when an alternating-current electrical signal is applied to a voice coil in a loudspeaker (such as a wire coil suspended in the gap between the poles of a permanent magnet), the voice coil, and a speaker cone coupled to the voice coil, move back and forth. The motion of the speaker cone produces sound in an audible frequency range.

Many loudspeakers include multiple transducers or drivers that produce sound in different portions of the audible frequency range. For example, a loudspeaker may include a tweeter to produce high audio frequencies, a mid-range driver for middle audio frequencies, and a woofer or subwoofer for low audio frequencies.

The perceived audio quality of the sound output by a loudspeaker can be impact by a variety of factors. For example, low frequency room modes can cause local minima and maxima in the sound amplitude at different locations in an environment (such as a room) that includes a loudspeaker. In principle, if the acoustic characteristics of the environment are known, the electrical signals used to drive the woofer can be modified to reduce or eliminate the effect of room modes on the sound output by the loudspeaker. In this way, a listener may have a higher-fidelity or higher-quality listening experience, i.e., the sound produced in the environment may more closely approximate or match the original recorded acoustic content.

In practice, it can be difficult to accurately characterize the room modes and, more generally, the acoustic characteristics of the environment. In particular, in order to accurately characterize the environment, the distortions or filtering associated with the measurement equipment needs to be known. For example, when a microphone with predetermined acoustic characteristics is used to perform measurements in the environment, the measurements can be corrected for the impact of the predetermined acoustic characteristics. However, when the acoustic characteristics of the microphone are unknown, it can be difficult to correct the measurements, which may degrade the accuracy of the determined acoustic characteristics of the environment. Consequently, the correction or modification to the electrical signals may be incorrect, which may result in degraded audio quality and, thus, may adversely impact the listener experience.

SUMMARY

The described embodiments relate to an electronic device that determines a transfer function of an environment. This electronic device may include: a microphone, a display, memory that stores a program module, and a processor that executes the program module to perform operations. During operation, the electronic device may provide, via the display, an instruction to position the electronic device proximate to a speaker in an environment. Then, the electronic device performs, using the microphone, acoustic measurements in the environment. Moreover, the electronic device calculates, based on the acoustic measurements and a first predetermined transfer function of the speaker, a transfer function of the microphone in a first band of frequencies. Next, the electronic device may provide, via the display, another instruction to position the electronic device at other locations in the environment. Furthermore, the electronic device performs, using the microphone, additional acoustic measurements in the environment. Additionally, the electronic device determines, based on the additional acoustic measurements, the transfer function of the microphone and a second predetermined transfer function of the speaker, a transfer function of the environment in a second band of frequencies.

Furthermore, calculating the transfer function of the microphone may involve: determining parameters for a set of predefined transfer function based on the acoustic measurements and the first predetermined transfer function of the speaker; calculating errors between the acoustic measurements and the set of predefined transfer functions; and selecting a predefined transfer function based on the errors as the transfer function of the microphone.

Note that the environment may include a room and the transfer function of the environment may characterize room modes.

Additionally, the electronic device may include an interface circuit that communicates with the speaker. Then, during operation, the electronic device may transmit information to the speaker that specifies: the transfer function of the environment, one or more extrema in the transfer function of the environment, and/or a correction for the one or more extrema.

Moreover, the first band of frequencies may be the same of different than the second band of frequencies.

In some embodiments, the other locations are different than a location of the electronic device during the acoustic measurements. For example, the other locations are other than proximate to the speaker.

Note that the electronic device may include: a remote control, and/or a cellular telephone.

Furthermore, the other instruction may include an instruction to move with the electronic device in the environment.

Additionally, during operation, the electronic device may trigger the speaker to output predefined acoustic information, and the calculating of the transfer function of the microphone and/or the transfer function of the environment may be based on the predefined acoustic information.

Another embodiment provides a computer-readable storage medium for use with an electronic device. This computer-readable storage medium includes the program module with instructions for at least some of the operations performed by the electronic device.

Another embodiment provides a method for determining a transfer function of an environment, which may be performed by the electronic device.

The preceding summary is provided as an overview of some exemplary embodiments and to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An electronic device with a microphone is used to determine a transfer function of an environment (and, more generally, an acoustic characteristic). In particular, the electronic device may use the microphone to perform acoustic measurements when the electronic device is proximate to a speaker in the environment (i.e., measurements in a near field of the speaker). Then, based on the acoustic measurements and a first predetermined transfer function of the speaker, the electronic device may calculate a transfer function of the microphone in a band of frequencies. Moreover, the electronic device may use the microphone to perform additional acoustic measurements in the environment that includes the speaker. These additional measurements may be performed at different locations in the environment than the acoustic measurements (such as measurements in the far field of the speaker). Next, based on the additional acoustic measurements, the transfer function of the microphone and a second predetermined transfer function of the speaker, the electronic device may determine the transfer function of the environment in the same or a different band of frequencies.

By determining the transfer function of the microphone, this characterization technique may allow an electronic device (such as a cellular telephone and/or a remote control) with a microphone having an initially unknown transfer function (and, more generally, one or more unknown acoustic characteristics) to be used to accurately determine the transfer function of the environment (and, more generally, one or more acoustic characteristics of the environment). Moreover, at least a portion of the transfer function of the environment (such as one or more extrema in the transfer function of the environment) may be used, e.g., by the speaker to modify sound output by the speaker to reduce or correct for the effect of the transfer function of the environment on the sound. In this way, the characterization technique may facilitate improved audio quality and, thus, may improve the listener experience when listening to sound output by the speaker.

In the discussion that follows, electronic devices and/or components in a system may communicate using a wide variety of communication protocols. For example, the communication may involve wired or wireless communication. Consequently, the communication protocols may include: an Institute of Electrical and Electronics Engineers (IEEE) 802.11 standard (which is sometimes referred to as 'Wi-Fi®,' from the Wi-Fi Alliance of Austin, Tex.), Bluetooth®

(from the Bluetooth Special Interest Group of Kirkland, Wash.), another type of wireless interface (such as another wireless-local-area-network interface), a cellular-telephone communication protocol (e.g., a 3G/4G/5G communication protocol, such as UMTS, LTE), an IEEE 802.3 standard (which is sometimes referred to as 'Ethernet'), etc. In the discussion that follows, Wi-Fi is used as an illustrative example.

Figure 1:
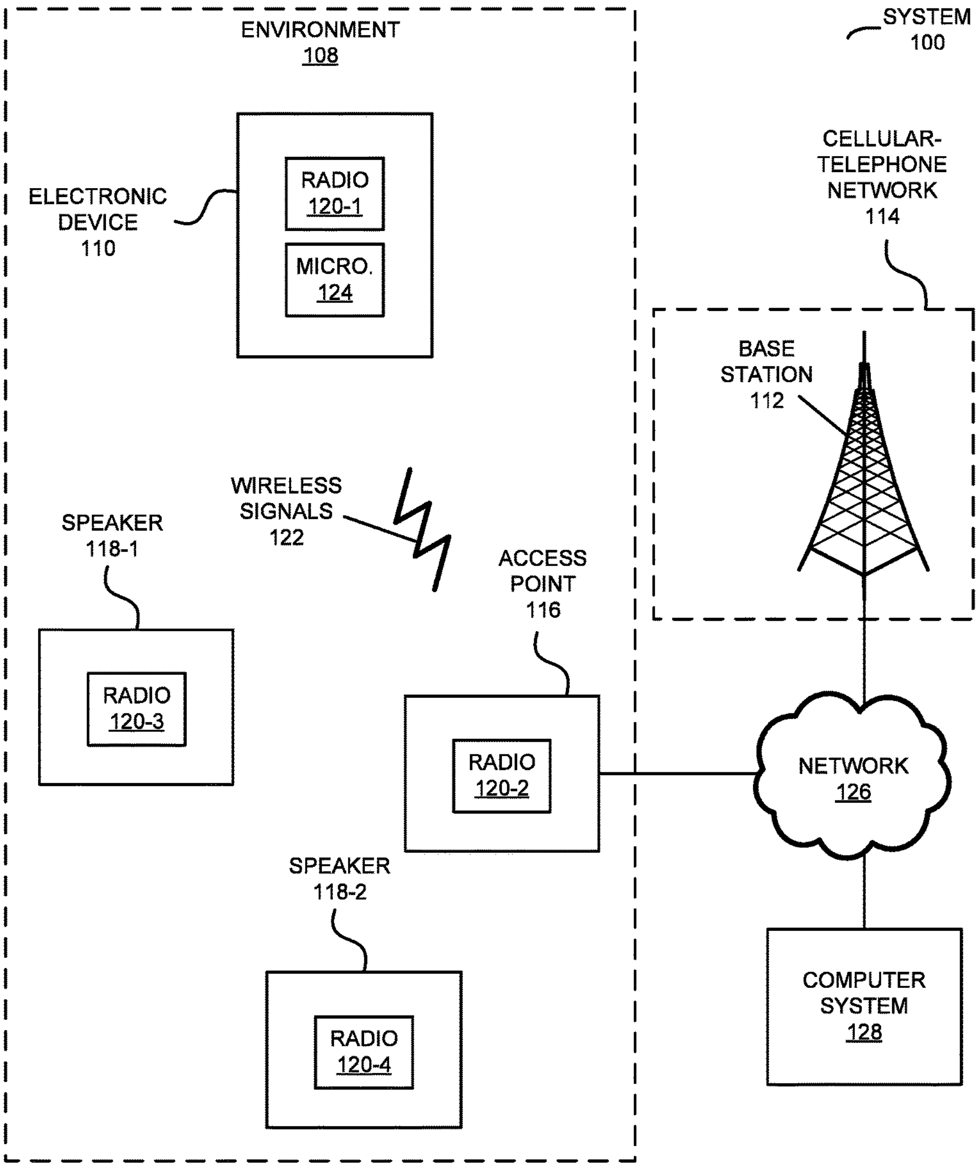
FIG. 1 is a block diagram illustrating an example of a system that determines a transfer function of an environment.

Communication among electronic devices is shown in FIG. 1, which presents a block diagram illustrating a system 100 that determines a transfer function of an environment 108 (such as a room). In particular, system 100 includes an electronic device 110 (such as a portable electronic device, e.g., a cellular telephone and/or a remote control), optional base station 112 in cellular-telephone network 114, optional access point 116 and/or one or more speakers 118, which are sometimes collectively referred to as 'components' in system 100.

Note that components in system 100 may communicate with each other via cellular-telephone network 114 and/or a network 126 (such as the Internet and/or a wireless local area network or WLAN). For example, electronic device 110 may provide trigger information to one of speakers 118 (such as speaker 118-1) via cellular-telephone network 114 and/or network 126, which may instruct speaker 118-1 to output predefined acoustic information. In addition, electronic device 110 may provide, via cellular-telephone network 114 and/or network 126, environmental information that specifies: the transfer function of environment 108, one or more extrema in the transfer function of environment 108, and/or a correction for the one or more extrema.

In embodiments where the communication involves wireless communication via a WLAN, the wireless communication includes: transmitting advertising frames on wireless channels, detecting another component in system 100 by scanning wireless channels, establishing connections (for example, by transmitting association requests, data/management frames, etc.), optionally configuring security options (e.g., Internet Protocol Security), and/or transmitting and receiving packets or frames via the connection (such as the trigger information and/or the environmental information, etc.). Moreover, in embodiments where the communication involves wireless communication via cellular-telephone network 114, the wireless communication includes: establishing connections, and/or transmitting and receiving packets (which may include the trigger information and/or the environmental information, etc.).

Figure 4:
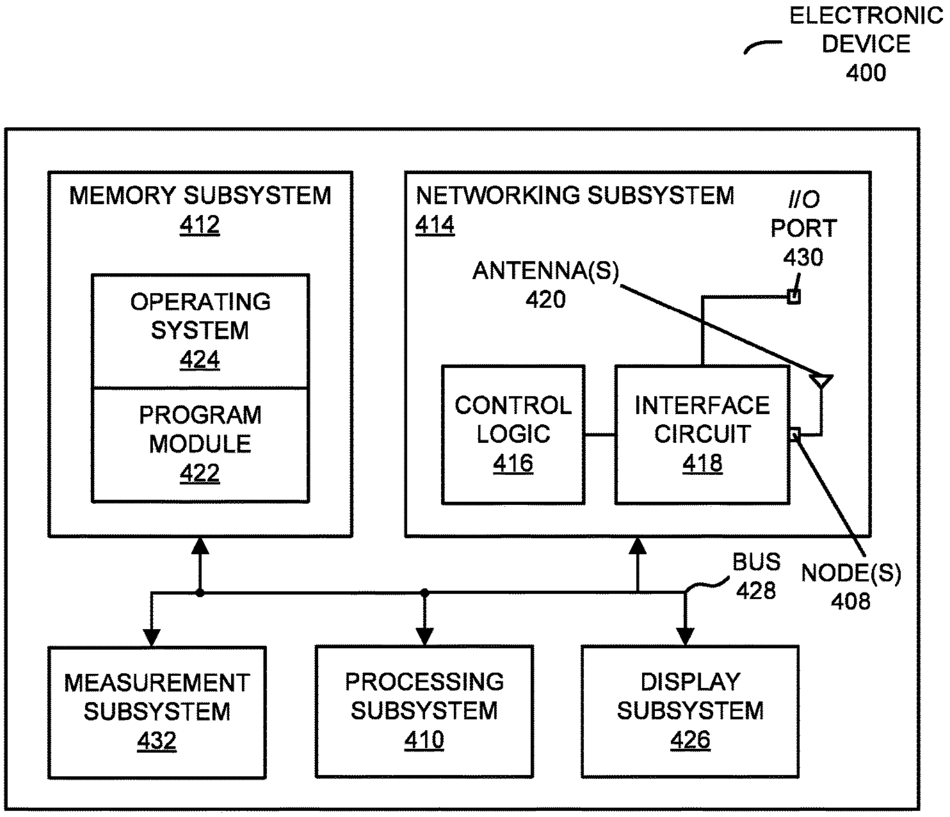
FIG. 4 is a block diagram illustrating an example of an electronic device in the system of FIG. 1 in accordance with an embodiment of the present disclosure.

As described further below with reference to FIG. 4, electronic device 110, optional base station 112, optional access point 116 and/or one or more speakers 118 may include subsystems, such as a networking subsystem, a memory subsystem and a processor subsystem. In addition, electronic device 110, optional base station 112, optional access point 116 and/or one or more speakers 118 may include radios 120 in the networking subsystems. More generally, the components can include (or can be included within) any electronic devices with the networking subsystems that enable these components to communicate with each other.

Moreover, as can be seen in FIG. 1, wireless signals 122 (represented by a jagged line) are transmitted by radios 120 in the components. For example, radio 120-1 in electronic device 110 may transmit information (such as frames or packets) using wireless signals 122. These wireless signals may be received by radios 120 in one or more of the other components, such as by speaker 118-1. This may allow electronic device 110 to communicate information to speaker 118-1.

In the described embodiments, processing a packet or frame in a component may include: receiving the wireless signals with the packet or frame; decoding/extracting the packet or frame from the received wireless signals to acquire the packet or frame; and processing the packet or frame to determine information contained in the packet or frame (such as the trigger information and/or the environmental information, etc.).

Note that the communication between at least any two of the components in system 100 may be characterized by one or more of a variety of performance metrics, such as: a received signal strength indication (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

As discussed previously, it can be difficult to accurately determine the transfer function of environment 108. In particular, if a listener in environment 108 uses an acoustically uncharacterized electronic device 110 (such as their own cellular telephone) to perform acoustic measurements (and, more generally, to determine one or more acoustic characteristics of environment 108), the acoustic distortion or filtering associated with at least microphone 124 in electronic device 110 may be unknown. For example, the transfer function and/or the complex spectral response of microphone 124 may not be predefined or predetermined. Acoustic measurements in environment 108 may include a combination of the acoustic characteristics of environment 108, speaker 118-1 and microphone 124. In particular, the acoustic measurements may be a convolution of the impulse responses of environment 108, speaker 118-1 and microphone 124 with a time-varying electrical signal (corresponding to acoustic content) that drives speaker 118-1. Alternatively, the acoustic measurements may be a product of the complex (amplitude and phase) spectral responses of environment 108, speaker 118-1, microphone 124 and the electrical signal. Because the effect of microphone 124 is unknown, it may not be possible for electronic device 110 to reduce or correct for the distortions or filtering associated with microphone 124. Therefore, there may be errors in estimates of the one or more acoustic characteristics of environment 108, such as one or more room modes. These errors may, in turn, reduce the quality of the sound from speaker 118-1 in environment 108.

Moreover, as described further below with reference to FIGS. 2-4, in order to address this problem, electronic device 110 may determine one or more acoustic characteristic of microphone 124. Then, using one or more known (i.e., predefined or predetermined) acoustic characteristics of speaker 118-1, electronic device 110 may determine one or more acoustic characteristics of environment 108. Information associated with the one or more acoustic characteristics of environment 108 may be provided to speaker 118-1, which may use this information to reduce or eliminate distortions associated with environment 108. For example, speaker 118-1 may modify electrical signals (corresponding to audio content) that drive speaker 118-1, so that the sound output by speaker 118-1 reduces or corrects for the distortions associated with environment 108.

While the characterization technique may be used to correct for the complex spectral responses of speaker 118-1 and/or microphone 124, in the discussion that follows the magnitudes of the complex spectral responses are used (i.e., the transfer functions). However, in other embodiments at least some of the intermediate operations in the characterization technique use the complex spectral response and then the magnitude of the result is used in subsequent operations. Consequently, in the present discussion a 'transfer function' in a given operation in the characterization technique should be understood to be real or complex. (In addition, note that a 'transfer function' may be defined based on air pressures or electrical signals.) Moreover, while speaker 118-1 may reduce or correct for a variety of acoustic characteristics of environment 108, in the discussion that follows speaker 118-1 reduces or corrects for one or more room modes (i.e., low-frequency modes, e.g., between 10-200 Hz) in environment 108.

In particular, electronic device 110 may provide the trigger information to speaker 118-1, so that speaker 118-1 outputs sound corresponding to predefined acoustic information (such as a known acoustic pattern or signal, which may be within an audible frequency band). This predefined acoustic information or content may be used in the characterization technique. Alternatively, using microphone 124, electronic device 110 may identify the acoustic content corresponding to the sound currently output by speaker 118-1, and this determined acoustic content may be used in the characterization technique.

Then, using at least microphone 124 (or, in some embodiments, multiple microphones, which may be arranged in an array), electronic device 110 may perform acoustic measurements of sound output by speaker 118-1 when microphone 124 is proximate to speaker 118-1. For example, the listener may be instructed (such as based on visual information displayed on a display in electronic device 110 and/or by verbal instructions output by a speaker in electronic device 110) to position electronic device 110 (and, thus, microphone 124) close to speaker 118-1 (such as within a few inches of a center of a speaker cone in speaker 118-1). Note that the effect of the transfer function of environment 108 may be reduced in these near-field acoustic measurements.

Next, electronic device 110 may use the acoustic measurements to determine the transfer function of microphone 124. In particular, electronic device 110 may, at one or more frequencies, divide the magnitude of the discrete Fourier transform of the acoustic measurements by the magnitude of the discrete Fourier transform of the predefined or predetermined acoustic content (which may be stored in electronic device 110) and a discrete Fourier transform of a first predefined or predetermined transfer function of speaker 118-1 at the location of electronic device 110 during the acoustic measurements (which may be stored in electronic device 110). (As noted previously, in other embodiments the division involves complex values and then the magnitude of the result of the division is used in subsequent operations in the characterization technique.) Moreover, electronic device 110 may calculate based on a result of the division (which is a good approximation to or estimate of the magnitude of the spectral response or the transfer function of microphone 124) the transfer function of microphone 124 in a first band of frequencies (such as at least a portion of the audible frequency band, e.g., 10-200 Hz, 10-10,000 Hz or 10-20,000 Hz). For example, electronic device 110 may determine parameters for a set of one or more predefined transfer functions based on the approximate or estimated transfer function of microphone 124 (e.g., electronic device 110 may fit the set of one or more predefined transfer functions to the approximate or estimated transfer function of microphone 124), and electronic device may select the predefined transfer function that has the smallest or minimum error with the approximate or estimated transfer function of microphone 124 (such as the minimum sum of the square error, the minimum sum of the error magnitude, the minimum root-mean-square error, the minimum sum of the square normalized error, the minimum sum of the normalized error magnitude, the minimum root-mean-square normalized error, etc.).

Furthermore, using at least microphone 124 (or, in some embodiments, multiple microphones, which may be arranged in an array), electronic device 110 may perform additional acoustic measurements of the sound output by speaker 118-1 when microphone 124 is distant from speaker 118-1. For example, the listener may be instructed (such as based on visual information displayed on a display in electronic device 110 and/or by verbal instructions output by a speaker in electronic device 110) to move to different locations in environment 108 with electronic device 110 (and, thus, microphone 124) for a time interval (such as 1 s, 10 s, 30 s or 60 s) while the additional acoustic measurements are performed. Thus, the additional acoustic measurements may be performed while microphone 124 is in the far field of speaker 118-1, so that the additional acoustic measurements include the effects of transfer functions of speaker 118-1 at the different locations, the transfer function of microphone 124 and the transfer function of environment 108.

However, using the selected predefined transfer function of microphone 124 and second predefined or predetermined transfer functions of speaker 118-1 at the different locations, electronic device 110 may determine a transfer function of environment 108 in a second band of frequencies (such as at least a portion of the audible frequency band, e.g., 10-200 Hz, 10-10,000 Hz, 10-20,000 Hz and/or one or more specific frequencies in at least one of these frequency ranges). Note that the second band of frequencies may be the same as or different from the first band of frequencies. For example, the second band of frequencies may be smaller than the first band of frequencies.

For example, electronic device 110 may, at one or more frequencies and based on additional acoustic measurements at a given location in environment 108, divide the magnitude of the discrete Fourier transform of the additional acoustic measurements by the magnitude of the discrete Fourier transform of the predefined or predetermined acoustic content, the magnitude of the selected predefined transfer of microphone 124 and a second predefined or predetermined transfer function of speaker 118-1 at the given location. (Once again, as noted previously, in other embodiments the division involves complex values and then the magnitude of the result of the division is used in subsequent operations in the characterization technique.) The result of the division may correspond to the transfer function of environment 108 at the one or more frequencies. As described further below, in some embodiments the variation (such as maxima and/or minima) in the transfer function of environment 108 of a function that corresponds to the transfer function of environment 108 (such as a power spectrum) at different locations in environment 108 may be used to estimate room modes.

Additionally, electronic device 110 may provide the environmental information to speaker 118-1. For example, the environmental information may specify or include: the transfer function of environment 108 in the second band of frequencies, one or more extrema in the transfer function of environment 108, and/or a correction for the one or more extrema. This environmental information may be stored in speaker 118-1. Subsequently, speaker 118-1 may use the environmental information to reduce or correct for the room modes by, e.g., equalizing the electrical signals corresponding to acoustic content (such as music) that are used to drive speaker 118-1.

In this way, the characterization technique may facilitate more accurate estimation of the room modes and, thus, improved audio quality in environment 108. Moreover, the characterization technique may allow the listener to characterize the room modes using an electronic device with an arbitrary microphone whose acoustic characteristic(s) are initially unknown. For example, the listener may use their cellular telephone to determine the room modes. This may reduce the cost and the complexity of the determination of the room modes, and may improve the overall user or listener experience.

Although we describe the network environment shown in FIG. 1 as an example, in alternative embodiments, different numbers or types of electronic devices may be present. For example, some embodiments comprise more or fewer components. As another example, in another embodiment, different components are transmitting and/or receiving packets or frames.

Figure 2:
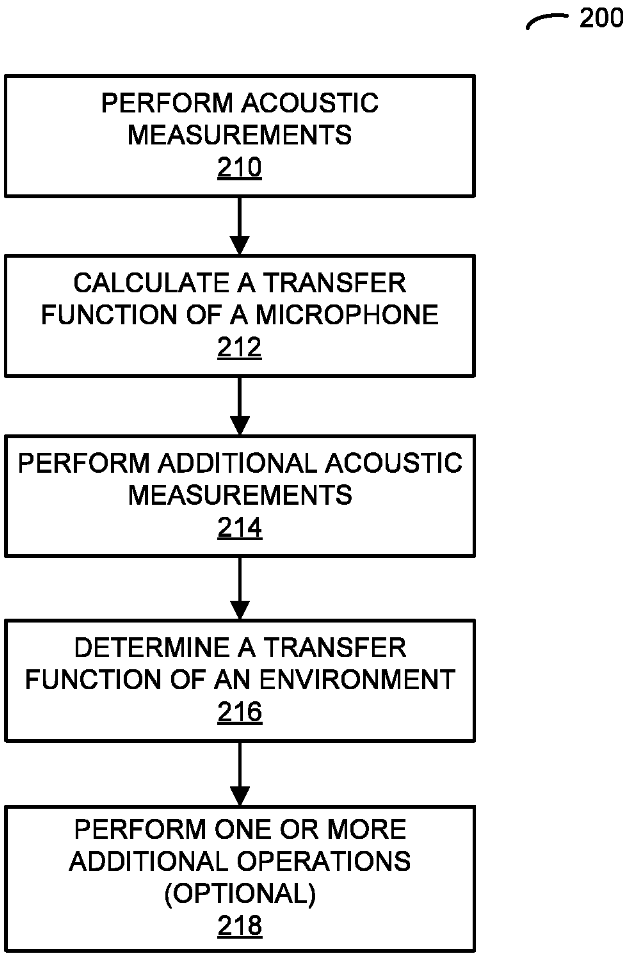
FIG. 2 is a flow diagram illustrating an example of a method for determining a transfer function of an environment in the system in FIG. 1 in accordance with an embodiment of the present disclosure.

FIG. 2 presents a flow diagram illustrating an example of a method 200 for determining a transfer function of an environment, which may be performed by an electronic device (such as electronic device 110 in FIG. 1). During operation, the electronic device may perform, using a microphone in the electronic device, acoustic measurements (operation 210) in the environment.

Then, the electronic device may calculate, based on the acoustic measurements and a first predetermined transfer function of the speaker, a transfer function of the microphone (operation 212) in a first band of frequencies. For example, calculating the transfer function of the microphone may involve: determining parameters for a set of predefined transfer functions based on the acoustic measurements and the first predetermined transfer function of the speaker; calculating errors between the acoustic measurements and the set of predefined transfer functions; and selecting a predefined transfer function based on the error as the transfer function of the microphone. In particular, the selected predefined transfer function may have: a minimum sum of the error magnitude, a minimum sum of the square error, a minimum root-mean-square error, a minimum sum of the square normalized error, a minimum sum of the normalized error magnitude, a minimum root-mean-square normalized error, etc.

Moreover, the electronic device may perform, using the microphone, additional acoustic measurements (operation 214) in the environment that includes the speaker.

Next, the electronic device may determine, based on the additional acoustic measurements, the transfer function of the microphone and a second predetermined transfer function of the speaker, a transfer function of the environment (operation 216) in a second band of frequencies. Note that the environment may include a room and the transfer function of the environment may characterize room modes. Moreover, the first band of frequencies may be the same of different than the second band of frequencies. Furthermore, the additional acoustic measurements may be performed at one or more different locations in the environment than the acoustic measurements. For example, the additional acoustic measurements may be performed at one or more locations in the environment that are other than proximate to the speaker.

In some embodiments, the electronic device optionally performs one or more additional operations (operation 218). For example, the electronic device may trigger the speaker to output predefined acoustic information, and the calculating of the transfer function of the microphone and/or the transfer function of the environment may be based on the predefined acoustic information. Moreover, the electronic device may provide information that specifies: where or how to position the electronic device during the acoustic measurements, and/or where or how to position the electronic device during the additional acoustic measurements. Furthermore, the electronic device may transmit information to the speaker that specifies: the transfer function of the environment, one or more extrema in the transfer function of the environment, and/or a correction for the one or more extrema.

In some embodiments of method 200, there may be additional or fewer operations. Moreover, the order of the operations may be changed, and/or two or more operations may be combined into a single operation. For example, instead of or in addition to providing the information that specifies where or how to position the electronic device during the acoustic measurements and/or the additional acoustic measurements, the electronic device may determine its location relative to the speaker (such as using triangulation and/or trilateration using wireless communication, using wireless ranging, etc.). Then, when the electronic device is in a suitable location (such as proximate to or distal from the speaker), the electronic device may trigger the speaker, perform the acoustic measurements and/or the additional acoustic measurements, etc.

In this way, the electronic device (for example, software executed in an environment, such as an operating system, of the electronic device) may facilitate accurate acoustic characterization of the environment using a microphone having one or more initially unknown acoustic characteristics (such as the acoustic transfer function of the microphone). This capability may facilitate improved audio quality, and thus may enhance the listener experience when using the electronic device and/or the speaker.

Figure 3:
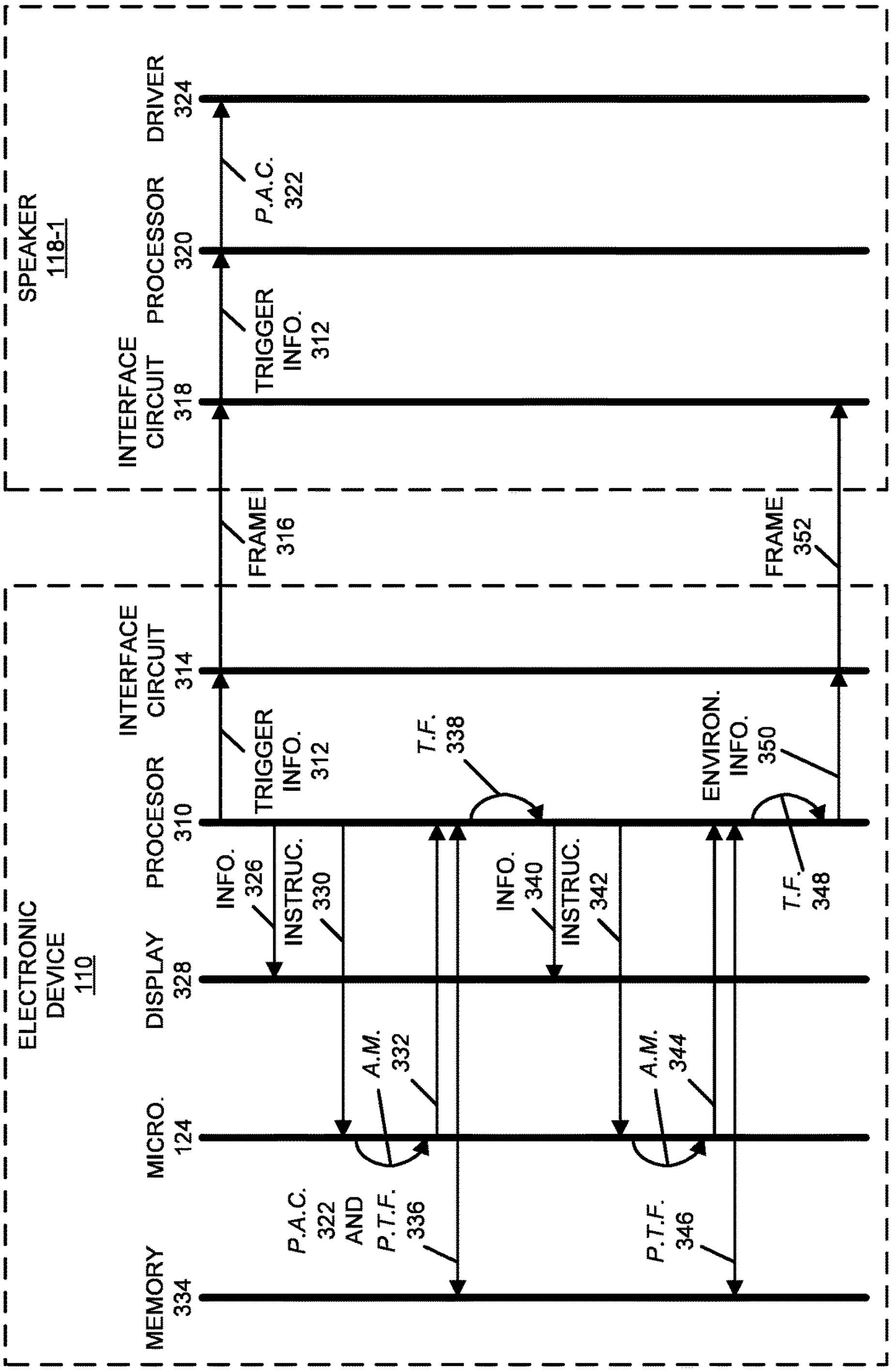
FIG. 3 is a drawing illustrating an example of communication among components in the system in FIG. 1 in accordance with an embodiment of the present disclosure.

Embodiments of the characterization technique are further illustrated in FIG. 3, which presents a drawing illustrating an example of communication among components in system 100 (FIG. 1). In particular, during characterization technique, processor 310 in electronic device 110 may provide trigger information 312 to interface circuit 314. In response, interface circuit 314 may transmit a packet or frame 316 to speaker 118-1 with trigger information 312.

After receiving frame 316, interface circuit 318 in speaker 118-1 may provide trigger information 312 to processor 320 in speaker 118-1. Based on trigger information 312, processor 320 may provide information that specifies predefined acoustic information (P.A.C.) 322 (or a corresponding electrical signal) to transducer or driver 324, so that speaker 118-1 outputs sound into an environment that includes speaker 118-1 and electronic device 110. Note that predefined acoustic information 322 may be included in frame 316 and/or may be stored in memory in speaker 118-1.

Then, processor 310 may provide information 326 to display 328, which displays information 326. For example, information 326 may specify where or how to position electronic device 110. In particular, information 326 may indicate that a user of electronic device 110 position electronic device 110 proximate to a center of a speaker cone in speaker 118-1, such as within a few inches of the center of the speaker cone.

Next, processor 310 may instruct 330 at least microphone 124 (or multiple microphones, which may be arranged in an array) to perform acoustic measurements (A.M.) 332 of the sound output by speaker 118-1 in the environment, and microphone 124 provides information specifying acoustic measurements 332 to processor 310. Moreover, processor 310 may access, in memory 334, information that specifies predefined acoustic information 322 and a predetermined transfer function (P.T.F.) 336 of speaker 118-1 at the location of electronic device 110 during acoustic measurements 332.

Furthermore, based on predefined acoustic information 322, acoustic measurements 332 and predetermined transfer function 336, processor 310 may calculate a transfer function (T.F.) 338 of microphone 124 in a first band of frequencies.

Additionally, processor 310 may provide information 340 to display 328, which displays information 340. For example, information 340 may specify where or how to position electronic device 110. In particular, information 340 may indicate that a user of electronic device 110 position electronic device 110 distal or further away from speaker 118-1, such as at different locations in the environment.

Then, processor 310 may instruct 342 at least microphone 124 (or multiple microphones, which may be arranged in an array) to perform acoustic measurements 344 of the sound output by speaker 118-1 in the environment. Moreover, processor 310 may access, in memory 334, information that specifies predetermined transfer function(s) 346 of speaker 118-1 at the locations of electronic device 110 during acoustic measurements 344.

Next, based on predefined acoustic information 322, acoustic measurements 344, transfer function 338 and predefined transfer function(s) 346, processor 310 may calculate a transfer function 348 of the environment in a second band of frequencies.

In some embodiments, processor 310 provide environmental information 350 (which corresponds to transfer function 348) to interface circuit 314. In response, interface circuit 314 may transmit a packet or frame 352 to speaker 118-1 with environmental information 350, which may subsequently use environmental information to modify (such as equalize) acoustic content output by driver 324.

While the preceding example illustrated one-time triggering of speaker 118-1 to output sound corresponding to predefined acoustic information 322, in other embodiments speaker 118-1 is trigger prior to acoustic measurements 332 and then at least prior to acoustic measurements 344. Thus, speaker 118-1 may be triggered one or more times.

Furthermore, in the preceding discussion, the predefined transfer function of speaker 118-1 is a function of location in the environment relative to speaker 118-1. Thus, predefined transfer function 336 and predefined transfer function(s) 346 may be different. However, in other embodiments, the transfer function of speaker 118-1 used in the characterization technique is constant and the variation as a function of the distance from speaker 118-1 may be included in transfer function 348. Therefore, predefined transfer function 336 and predefined transfer function(s) 346 may be the same. (Similarly, the first predefined transfer function of the speaker may be the same as or different from the second predefined transfer function of the speaker.)

We now describe examples of the characterization technique. This characterization technique may be used to calibrate a microphone in a cellular telephone, so that the microphone can be used to characterize room modes. Moreover, information about the room modes may be used by a speaker to equalize audio content to reduce or correct for the room modes.

It may be desirable to modify an electrical frequency response of a subwoofer to compensate for distortion in the pressure response determined at one or more measurement (listening) positions in an environment, such as a room. In order to accurately characterize the acoustic conditions that need correcting/compensating, the acoustic responses of other electrical and acoustic components in the measurement system may need to be known. In particular, while the acoustic response of an instrumentation microphone may be known, the acoustic response of a microphone in a user's cellular telephone may be initially unknown.

The problem may be addressed using a measurement system that includes: a speaker having a known acoustic response (such as a known transfer function), an unknown room interaction and a microphone having an unknown acoustic response (such as an unknown transfer function).

Ideally, if the speaker was a perfect, infinitely small source (i.e., a point source), the acoustic pressure versus frequency at any given position away from the speaker would be a function of the distance to the point source (i.e., depending only on the distance). In practice, a variety of factors can cause deviations from this ideal behavior, including: the acoustic self-response of the speaker, interaction with the room (i.e., the room-to-listener response), and the acoustic response of the measurement microphone.

Typically, a speaker has characteristic low-frequency acoustic response that is a function of the drive-unit electromechanical parameters and the enclosure dimensions. In the measurement system, this frequency-dependent acoustic response or transfer function ($H_{speaker}$) is known by the manufacturer of the speaker.

Moreover, when the speaker is placed in a room, $H_{speaker}$ may be modified by the geometric attributes of the room, which may be represented as a spatial distribution of room modes. In general, the modification or frequency dependent transfer function of the environment ($H_{room}$) may be a function of the room geometry, the specific location of the speaker and the specific location of the measurement point (i.e., the microphone).

Furthermore, assuming the microphone is imperfect or unknown, it will also modify the measured response based on its frequency-dependent transfer function ($H_{microphone}$). Note that there may be variation in $H_{microphone}$ from microphone to microphone because of factors such as: capsule, packaging, software settings, production variation, etc.

At a given position of the microphone and a given position of the speaker, the total measured acoustic response function at the microphone is $$H_{measure}=H_{speaker}\cdot H_{room}\cdot H_{microphone}.$$

The objective of the measurement system is to identify $H_{room}$ in order to allow speaker 118-1 (or another component in system 100 in FIG. 1) determine what, if any, adjustment is required to reduce or eliminate the effect of the room modes. $H_{room}$ can be estimated by measuring $H_{measure}$ and normalizing by $H_{speaker}$ and $H_{microphone}$, i.e., $$H_{room}=\frac{H_{measure}}{H_{speaker}\cdot H_{microphone}}.$$

Note that, while $H_{speaker}$ may be known to the speaker manufacturer, $H_{microphone}$ of the microphone in a user's cellular telephone may not be known.

In order to determine what, if any, adjustment is required to reduce or eliminate the effect of the room modes, the electronic device may perform a calibration operation to estimate $H_{microphone}$. In particular, $H_{microphone}$ may be determined using different test conditions during the measurements.

For example, under anechoic conditions (such as in large anechoic chamber, outside, etc.), there are no room modes. This may be equivalent to having $H_{room}$ equal to one. Consequently, $H_{microphone}$ may be estimated as $$\frac{H_{measure}}{H_{speaker}}.$$

By performing near-field measurement (i.e., very close to the speaker), the contribution of the room modes may be minimized relative to that of the speaker. In principle, if the microphone is sufficiently close to the speaker, $H_{speaker}$ may dominate and no room modes may be apparent, which is equivalent to $H_{room}$ equal to one and, thus, to anechoic conditions. In practice, in a typically sized residential room, the room modes may still overlay the near-field acoustic response. In addition, it may not be practical for the electronic device to be sufficiently close to the speaker for the room modes to disappear or to be negligible. Consequently, it can be difficult to estimate $H_{microphone}$ by dividing the near-field $H_{measure}$ by $H_{speaker}$ because of the residual contribution of the room modes. Indeed, subsequent acoustic measurements that used the poorly determined $H_{microphone}$ may under-accentuate the room modes that are targeted in the characterization technique.

In the characterization technique, the residual contribution of the room modes may be corrected using smoothing. For example, the electronic device may apply data smoothing (such as local averaging or low-pass filtering) to smooth out the residual room modes. However, the data smoothing can eventually smooth out some of $H_{microphone}$.

Consequently, in some embodiments the residual contribution of the room modes is corrected by fitting the near-field measurements to plausible predefined microphone acoustic responses or transfer functions. In general, while microphones in cellular-telephones may have varying responses, they typically exhibit some form of high-pass behavior. Therefore, the set of predefined transfer functions of the microphone may include high-pass filters (which are sometimes referred to as 'analog function prototypes'). For example, the set of predefined transfer functions of the microphone may include: a $2^{nd}$-order high-pass filter with two initial parameter values, including a quality factor (Q) of 1 and a cutoff frequency ($f_c$) of 40 Hz; a $4^{th}$-order high-pass filter with at least two initial parameter values, including a Q of 0.5 and an $f_c$ of 41 Hz; a $3^{rd}$-order high-pass filter with at least two initial parameter values, including a Q of 0.9 and an $f_c$ of 60 Hz.

Note that the shapes of the predefined transfer functions may be inherently smooth and, therefore, may exclude one or more of the extrema associated with the room modes that can pollute the near-field measurements. Moreover, the predefined transfer functions can be parameterized and fit to the near-field measurements using, e.g., a least-squares technique, Newton's method, etc. The best fit with the minimum square error relative to the near-field measurements may be selected as the estimate of $H_{microphone}$.

In some embodiments, the characterization technique is used to determine a transfer function of a microphone and, then, may characterize one or more room modes in a room (or at least a partially enclosed region or environment). Initially, a speaker (such as a subwoofer) may be ready to receive commands from a smartphone application via Bluetooth Low Energy (BLE). Moreover, a speaker may include information that specifies a measurement stimulus or predefined acoustic information. For example, the measurement stimulus may include a logarithmic sweep from 10 Hz to 1 kHz over 1.798 s. The smartphone may be ready to send commands to the speaker via BLE and may store the information that specifies the measurement stimulus. Furthermore, the smartphone may store a 99-point array of frequencies (ArrayF), which may be logarithmically spaced between 10-200 Hz. In addition, the smartphone may store the subwoofer near-field calibration reference curve for one or more subwoofer models. These near-field calibration references may be the predicted acoustic responses of the different subwoofer models at a predefined calibration location (such as on an edge of a top face of the speaker, nearest to the subwoofer). Note that each of the calibration references may be an array of normalized pressures (in pascals per unit volume) evaluated at the frequencies in ArrayF.

During the characterization technique, a program module or application may start executing on the smartphone. Then, the application may obtain the model number of the subwoofer, e.g., via BLE communication between the smartphone and the speaker. Moreover, a user of the smartphone may be prompted to place the smartphone on the speaker at the calibration position. Next, the application may instruct or command the subwoofer to play the measurement stimulus, e.g., at an amplitude of 10 V peak. The application may create a reference copy of the measurement stimulus and amplitude.

Furthermore, the application may start a recording of the sound emanating from the subwoofer using a microphone in the smartphone. For example, the recording may have a four second duration at 8 k samples/s. If the maximum peak recorded amplitude is greater than −0.1 dB of full scale, the application may retrigger and remeasure at half the voltage (such as at 5 V peak). Alternatively, if the maximum peak recorded amplitude is smaller than −40 dB of full scale, the application may retrigger and remeasure at twice the voltage (such as at 10 V peak instead of 5 V peak). Note that the recorded data may be time aligned with the measurement stimulus using cross-correlation in order to keep or use the most-relevant time interval (such as a time interval of 1.798 sec. If the recording is too late or early for this to be possible, the application may retrigger and remeasure.

Then, the application may take the Fourier transform (such as the discrete Fourier transform) of the recorded data and the measurement stimulus, and may calculate the measurement transfer function as their ratio. The application may smooth or interpolate the transfer function data to the frequency bins of ArrayF of the calibration reference function. Moreover, the application may element-wise divide the measurement transfer function by the near-field calibration reference of the subwoofer model to determine a corrected measurement transfer function.

Next, the application may fit the parameters of a set of predefined transfer functions of the microphone to the corrected measurement transfer function. For example, the set of predefined transfer functions may include: a $1^{st}$-order high-pass filter having two initial parameter values (an $f_c$ of 50 Hz and a gain of one); a $2^{nd}$-order high-pass filter having three initial parameter values (an $f_c$ of 50 Hz, a Q of 0.7 and a gain of one); a $3^{rd}$-order high-pass filter having four initial parameter values (an $f_{c1}$ of 50 Hz, an $f_{c2}$ of 50 Hz, a Q of 0.7 and a gain of one); and a $4^{th}$-order high-pass filter having five initial parameter values (an $f_{c1}$ of 50 Hz, an $f_{c2}$ of 50 Hz, a $Q_1$ of 0.7, a $Q_2$ of 0.7 and a gain of one). During the fitting, the initial filter parameters may be modified, e.g., via the Nelder-Mead Simplex Method, to minimize the sum of the square errors, evaluated at ArrayF, between the high-pass filters and the corrected measurement transfer function. The application may select best fit to the four predefined transfer functions as the transfer function of the microphone.

Furthermore, the application may element-wise multiply the near-field calibration reference of the subwoofer model by the selected transfer function of the microphone to determine a system calibration function ($H_{cal}$).

Additionally, the application may inform the user that the calibration has been determined, and may prompt the user to go to the first of eight measurement locations of their choice in the user's listening area. Then, the application may command or instruct the subwoofer to play the measurement stimulus again. The application may record, test, time-align and conditionally restart if necessary (as described previously) until an accurate measurement is obtained. Moreover, the application may calculate the measurement transfer function as described previously, except that it is now divided by $H_{cal}$ and stored, in memory in the smartphone, as a first calibrated room response.

The application may then prompt the user to choose another location and may repeat the aforementioned operations until eight suitable room responses are obtained. The application may store the eight calibrated room response functions in a 99×8 matrix (where the rows of the matric are values at ArrayF).

Next, the application may indicate to the user that it is calculating the optimal equalization. During this calculation, the application may compute the magnitude squared of the eight room response functions and may average along the eight columns in the matrix to create a power spectrum average (PSA). Furthermore, the application may convert the PSA to decibels and may normalize the level relative to its mean value between 30-140 Hz. Additionally, the application may taper the PSA, between 10-30 Hz and 140-200 Hz, towards 0 db with a smoothing window. The application may also shift the PSA up by 4 dB in order to accentuate peaks and to de-accentuate dips or minima.

Moreover, the application may perform a peak-search technique on the normalized/modified PSA to select the most prominent peaks in amplitude and width. Then, the application may, via BLE, send information that specifies or that corresponds to the identified peaks (such as information that is a function of the identified peaks) to the speaker, which may store the information for subsequent use when equalizing acoustic content (such as music) to correct for the identified room modes when such equalization is enabled (e.g., by the user or automatically, as needed, such as based on audio content being played, etc.).

Next, the application may inform the user that the automatic equalization is complete. Furthermore, the application may instruct the speaker to resume normal operation.

We now describe embodiments of an electronic device. FIG. 4 presents a block diagram illustrating an example of an electronic device 400, such as electronic device 110, optional base station 112, optional access point 116 and/or one or speakers 118 in FIG. 1. This electronic device includes processing subsystem 410, memory subsystem 412, and networking subsystem 414. Processing subsystem 410 includes one or more devices configured to perform computational operations. For example, processing subsystem 410 can include one or more microprocessors, one or more GPUs, one or more application-specific integrated circuits (ASICs), one or more microcontrollers, one or more programmable-logic devices, and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as program module 422 or operating system 424), which may be executed by processing subsystem 410. Note that the one or more computer programs may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

Note that program module 422 may be a software product or application program, such as instances of a software application that, at least in part, is resident on and that executes on electronic devices 400. In some implementations, the users may interact with a web page that is provided by a remote computer system (such as computer system 128 in FIG. 1) via a network (such as network 126 in FIG. 1), and which is rendered by a web browser on electronic device 400. For example, at least a portion of the software application executing on electronic device 400 may be an application tool that is embedded in the web page, and that executes in a virtual environment of the web browser. Thus, the application tool may be provided to electronic device 400 via a client-server architecture. However, in other embodiments, the software product executes remotely from electronic device 400, such as on computer system 128 (FIG. 1). Additionally, program module 422 may, at least in part, be a standalone application or a portion of another application that is resident on and that executes on electronic device 400 (such as a software application that is installed on and that executes on electronic device 400). Consequently, at least some of the operations in the characterization technique may be performed remotely from electronic device 400, such as on or by computer system 128 (FIG. 1).

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Moreover, networking subsystem 414 may include one or more devices configured to couple to and communicate on a wired and/or wireless network (i.e., to perform network operations), including: control logic 416, an interface circuit 418, one or more antennas 420 and/or input/output (I/O) port 430. (While FIG. 4 includes one or more antennas 420, in some embodiments electronic device 400 includes one or more nodes 408, e.g., a pad, which can be coupled to one or more antennas 420. Thus, electronic device 400 may or may not include one or more antennas 420.) For example, networking subsystem 414 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 400 may use the mechanisms in networking subsystem 414 for performing simple wireless communication between the electronic devices, e.g., transmitting advertising or beacon frames and/or scanning for advertising frames transmitted by other electronic devices as described previously.

Within electronic device 400, processing subsystem 410, memory subsystem 412, and networking subsystem 414 are coupled together using bus 428. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections among the subsystems.

In some embodiments, electronic device 400 includes a display subsystem 426 for displaying information on a display, which may include a display driver and the display, such as a liquid-crystal display, a multi-touch touchscreen, etc. Moreover, electronic device 400 may optionally include a measurement subsystem 432 with one or more microphones for acquiring or performing acoustic measurements. In some embodiments, the one or more microphones are arranged in acoustic array that can measure acoustic amplitude and/or phase. (More generally, electronic device 400 may include a monitoring subsystem with one or more sensors for performing monitoring or measurements in an environment of an individual.)

Electronic device 400 can be (or can be included in) any electronic device with at least one network interface. For example, electronic device 400 can be (or can be included in): a desktop computer, a laptop computer, a subnotebook/netbook, a server, a tablet computer, a smartphone, a cellular telephone, a smartwatch, a consumer-electronic device, a portable computing device, an access point, a router, a switch, communication equipment, test equipment, a security camera, an aviation drone, a nanny camera, a wearable appliance, and/or another electronic device.

Although specific components are used to describe electronic device 400, in alternative embodiments, different components and/or subsystems may be present in electronic device 400. For example, electronic device 400 may include one or more additional processing subsystems, memory subsystems, networking subsystems, display subsystems and/or measurement subsystems. Additionally, one or more of the subsystems may not be present in electronic device 400. Moreover, in some embodiments, electronic device 400 may include one or more additional subsystems that are not shown in FIG. 4. Also, although separate subsystems are shown in FIG. 4, in some embodiments, some or all of a given subsystem or component can be integrated into one or more of the other subsystems or component(s) in electronic device 400. For example, in some embodiments program module 422 is included in operating system 424.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 414, such as a radio. Moreover, the integrated circuit may include hardware and/or software mechanisms that are used for transmitting wireless signals from electronic device 400 and receiving signals at electronic device 400 from other electronic devices. Aside from the mechanisms herein described, radios are generally known in the art and hence are not described in detail. In general, networking subsystem 414 and/or the integrated circuit can include any number of radios. Note that the radios in multiple-radio embodiments function in a similar way to the described single-radio embodiments.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, receiving the input data, etc.)

While a communication protocol compatible with Wi-Fi was used as illustrative examples, the described embodiments of the characterization technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the characterization technique may be implemented using program module 422, operating system 424 (such as a driver for interface circuit 418) and/or in firmware in interface circuit 418. Alternatively or additionally, at least some of the operations in the characterization technique may be implemented in a physical layer, such as hardware in interface circuit 418.

In the preceding description, we refer to 'some embodiments.' Note that 'some embodiments' describes a subset of all of the possible embodiments, but does not always specify the same subset of embodiments. Moreover, note that the numerical values provided are intended as illustrations of the characterization technique. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:

a microphone;

a display;

a processor coupled to the microphone and the display;

memory, coupled to the processor, configured to store a program module, wherein, when executed by the processor, the program module causes the electronic device to:

provide, via the display, an instruction to position the electronic device proximate to a speaker in an environment, wherein the position is associated with a near field of the speaker and is in front of the speaker;

perform, using the microphone, acoustic measurements in the environment;

calculate, based at least in part on the acoustic measurements and a first predetermined transfer function of the speaker, a transfer function of the microphone in a first band of frequencies, wherein, prior to the calculation, the transfer function of the microphone is unknown, and wherein the acoustic measurements used in the calculation are only performed by the electronic device;

provide, via the display, another instruction to position the electronic device at other locations in the environment, wherein the other locations are associated with a far field of the speaker;

perform, using the microphone, additional acoustic measurements in the environment; and determine, based at least in part on the additional acoustic measurements, the transfer function of the microphone and a second predetermined transfer function of the speaker, a transfer function of the environment in a second band of frequencies.

2. The electronic device of claim 1, wherein calculating the transfer function of the microphone involves:

determining parameters for a set of predefined transfer functions based at least in part on the acoustic measurements and the first predetermined transfer function of the speaker;

calculating errors between the acoustic measurements and the set of predefined transfer functions; and selecting a predefined transfer function based at least in part on the errors as the transfer function of the microphone.

3. The electronic device of claim 1, wherein the environment includes a room and the transfer function of the environment characterizes room modes.

4. The electronic device of claim 1, wherein the electronic device further comprises an interface circuit configured to communicate with the speaker; and wherein, when executed by the processor, the program module causes the electronic device to transmit information to the speaker that specifies one of: the transfer function of the environment, one or more extrema in the transfer function of the environment, and a correction for the one or more extrema.

5. The electronic device of claim 1, wherein the first band of frequencies is different than the second band of frequencies.

6. The electronic device of claim 1, wherein the other locations are different than a location of the electronic device during the acoustic measurements.

7. The electronic device of claim 1, wherein the other locations are other than proximate to the speaker.

8. The electronic device of claim 1, wherein the electronic device includes one of: a remote control, and a cellular telephone.

9. The electronic device of claim 1, wherein the other instruction includes an instruction to move with the electronic device in the environment.

10. The electronic device of claim 1, wherein, when executed by the processor, the program module causes the electronic device to trigger the speaker to output predefined acoustic information; and wherein calculating one of the transfer function of the microphone and the transfer function of the environment is further based at least in part on the predefined acoustic information.

11. A non-transitory computer-readable storage medium for use with an electronic device, the computer-readable storage medium storing a program module that, when executed by the electronic device, causes the electronic device to:

provide an instruction to position the electronic device proximate to a speaker in an environment, wherein the position is associated with a near field of the speaker and is in front of the speaker;

perform, using a microphone in the electronic device, acoustic measurements in the environment;

calculate, based at least in part on the acoustic measurements and a first predetermined transfer function of the speaker, a transfer function of the microphone in a first band of frequencies, wherein, prior to the calculation, the transfer function of the microphone is unknown, and wherein the acoustic measurements used in the calculation are only performed by the electronic device;

provide another instruction to position the electronic device at other locations in the environment, wherein the other locations are associated with a far field of the speaker;

perform, using the microphone, additional acoustic measurements in the environment; and determine, based at least in part on the additional acoustic measurements, the transfer function of the microphone and a second predetermined transfer function of the speaker, a transfer function of the environment in a second band of frequencies.

12. The computer-readable storage medium of claim 11, wherein calculating the transfer function of the microphone involves:

determining parameters for a set of predefined transfer functions based at least in part on the acoustic measurements and the first predetermined transfer function of the speaker;

calculating errors between the acoustic measurements and the set of predefined transfer functions; and selecting a predefined transfer function based at least in part on the errors as the transfer function of the microphone.

13. The computer-readable storage medium of claim 11, wherein the environment includes a room and the transfer function of the environment characterizes room modes.

14. The computer-readable storage medium of claim 11, wherein, when executed by the processor, the program module causes the electronic device to transmit information to the speaker that specifies one of: the transfer function of the environment, one or more extrema in the transfer function of the environment, and a correction for the one or more extrema.

15. The computer-readable storage medium of claim 11, wherein the first band of frequencies is different than the second band of frequencies.

16. The computer-readable storage medium of claim 11, wherein the other locations are other than proximate to the speaker.

17. The computer-readable storage medium of claim 11, wherein the electronic device includes one of: a remote control, and a cellular telephone.

18. The computer-readable storage medium of claim 11, wherein the other instruction includes an instruction to move with the electronic device in the environment.

19. The computer-readable storage medium of claim 11, wherein, when executed by the processor, the program module causes the electronic device to trigger the speaker to output predefined acoustic information; and wherein calculating one of the transfer function of the microphone and the transfer function of the environment is further based at least in part on the predefined acoustic information.

20. A method for determining a transfer function of an environment, comprising:

by an electronic device:

providing an instruction to position the electronic device proximate to a speaker in the environment, wherein the position is associated with a near field of the speaker and is in front of the speaker;

performing, using a microphone in the electronic device, acoustic measurements in the environment;

calculating, based at least in part on the acoustic measurements and a first predetermined transfer function of the speaker, a transfer function of the microphone in a first band of frequencies, wherein, prior to the calculation, the transfer function of the microphone is unknown, and wherein the acoustic measurements used in the calculation are only performed by the electronic device;

providing another instruction to position the electronic device at other locations in the environment, wherein the other locations are associated with a fax field of the speaker;

performing, using the microphone, additional acoustic measurements in the environment; and determining, based at least in part on the additional acoustic measurements, the transfer function of the microphone and a second predetermined transfer function of the speaker, a transfer function of the environment in a second band of frequencies.

21. The electronic device of claim 1, wherein the speaker includes a subwoofer and the first band of frequencies is associated with the subwoofer.

22. The computer-readable storage medium of claim 11, wherein the speaker includes a subwoofer and the first band of frequencies is associated with the subwoofer.

23. The method of claim 20, wherein the speaker includes a subwoofer and the first band of frequencies is associated with the subwoofer.

* * * * *